May 3, 1932.  E. SANDFANANDER  1,856,659
ENVELOPE MAKING MACHINE
Filed May 28, 1928   7 Sheets-Sheet 1

INVENTOR
ERNEST SANDFANANDER
BY Richard Steier
ATTORNEYS

May 3, 1932.  E. SANDFANANDER  1,856,659
ENVELOPE MAKING MACHINE
Filed May 28, 1928  7 Sheets-Sheet 5

INVENTOR
ERNEST SANDFANANDER
BY Richards Geier
ATTORNEYS

May 3, 1932. E. SANDFANANDER 1,856,659
ENVELOPE MAKING MACHINE
Filed May 28, 1928 7 Sheets-Sheet 6

INVENTOR
ERNEST SANDFANANDER
BY
Richards & Geier
ATTORNEYS

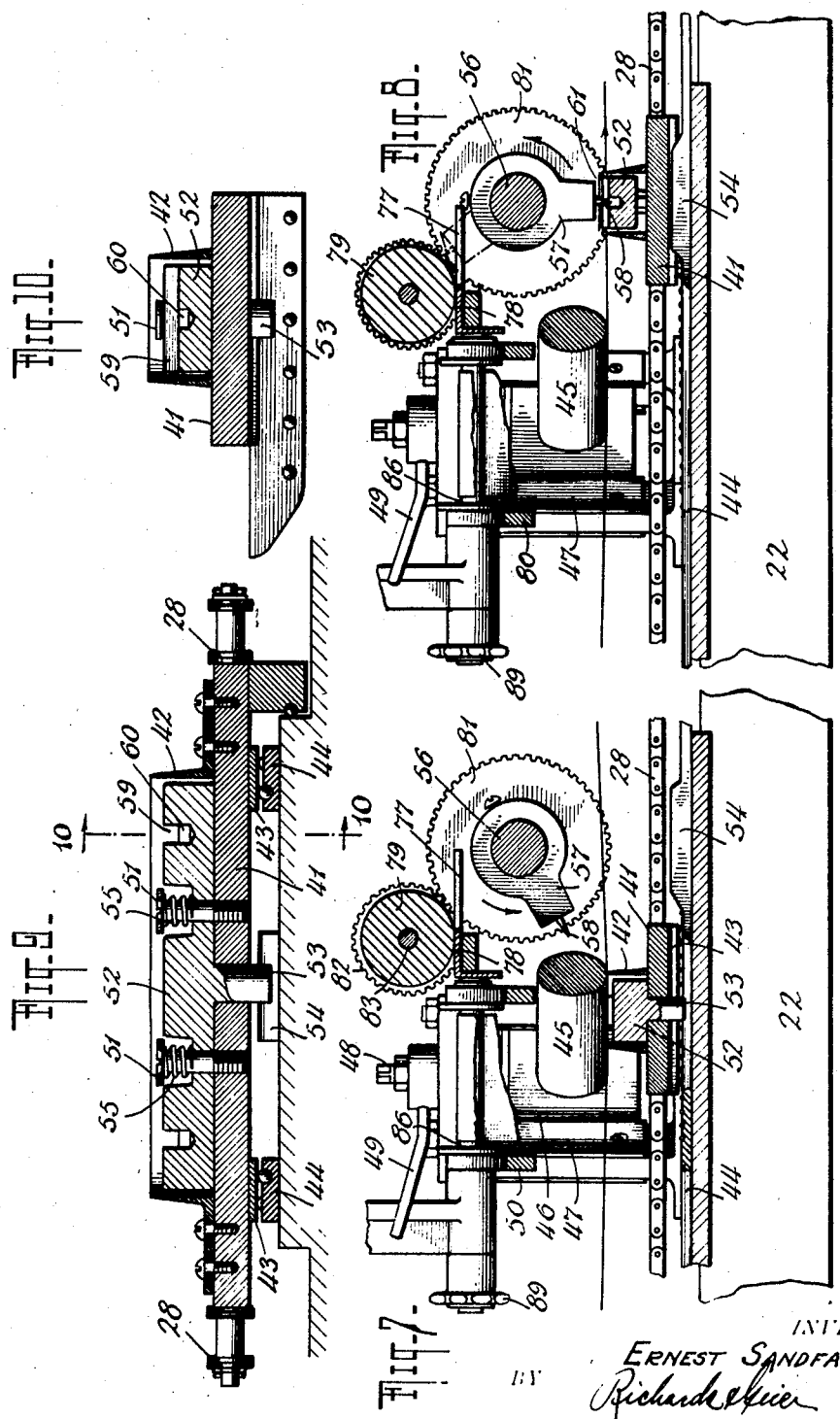

Patented May 3, 1932

1,856,659

UNITED STATES PATENT OFFICE

ERNEST SANDFANANDER, OF FREEPORT, NEW YORK, ASSIGNOR TO H. P. ANDREWS PAPER COMPANY, OF NEW YORK, N. Y., A CORPORATION OF NEW YORK

ENVELOPE MAKING MACHINE

Application filed May 28, 1928. Serial No. 281,210.

This invention relates to improvements in envelope-making machines, and has particular reference to a machine employed in the making of so-called window envelopes.

An object of the invention is to provide an improved machine for forming a series of window openings in a continuous web of paper which is being fed through the machine.

Another object is to successively form the openings in the web by the operation of a cutting mechanism, after which the cut-out portions of the web are removed from said mechanism and discharged from the machine.

A further object is to feed a web of transparent paper to the machine simultaneously with the operation of the cutting mechanism for the envelope web and to cut from the first named web a cover for each window opening in the envelope web, which cover is conveyed by suction to the latter web and applied thereto in covering position relative to an opening therein.

The above and other objects will appear more clearly from the following detailed description, when taken in connection with the accompanying drawings, which illustrate a preferred embodiment of the inventive idea.

In the drawings—

Figure 7 is an enlarged longitudinal section illustrating the position of the parts of the cutting mechanism while in the act of cutting the web to form the opening;

Figure 8 is a similar view showing the position of the parts just after an opening has been cut in the web;

Figure 9 is a transverse section through one of the units of the cutting mechanism;

Figure 10 is a section on the line 10—10 of Figure 9;

Figure 11 is a fragmentary detail elevation of the cutting device employed to cut predetermined lengths of transparent paper which form covers for the window openings and which are applied after the latter openings are made;

Figure 12 is an enlarged sectional view through a suction mechanism utilized to convey the transparent covers from the cutting device to the web in which the window openings are formed; and Figure 13 is a fragmentary plan view of the paper web as it is delivered from the machine preparatory to the web being cut to form the envelope, the latter operation being no part of the present invention.

Briefly, the present invention is designed to form, in a continuous web of paper, a series of window openings at predetermined intervals apart and to subsequently attach, by a suitable adhesive, a transparent cover to the web in covering position relative to each of the window openings, this covering being also cut from a continuous web of transparent material and applied to the first web subsequent to the formation of the window openings therein. When this operation is completed, the web of paper is fed from the machine to a cutting and folding machine of any suitable construction in which the formation of the envelope is completed.

Figure 3:
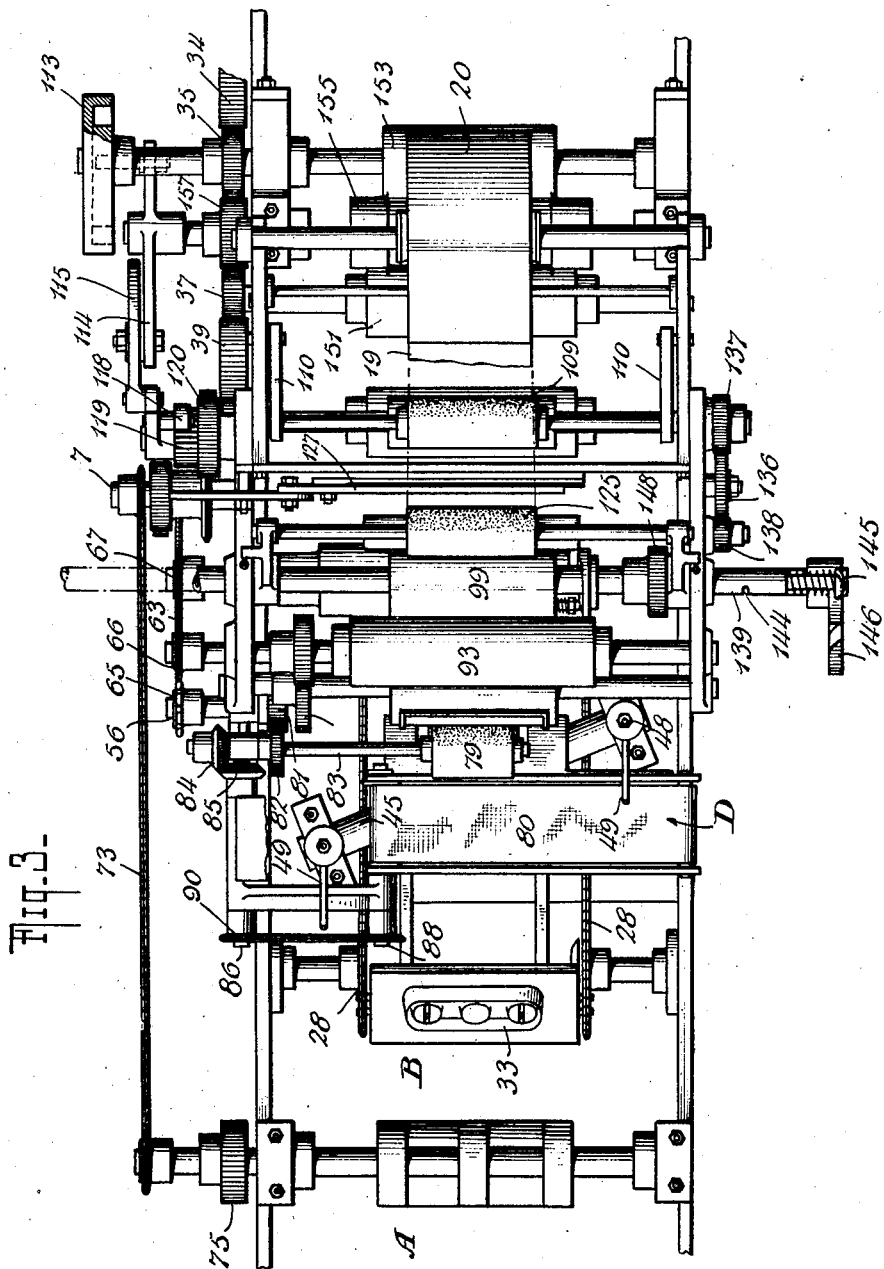
Figure 3 is a top plan view with certain parts, such as the adhesive reservoir, removed for purposes of clearness.
Figure 4:
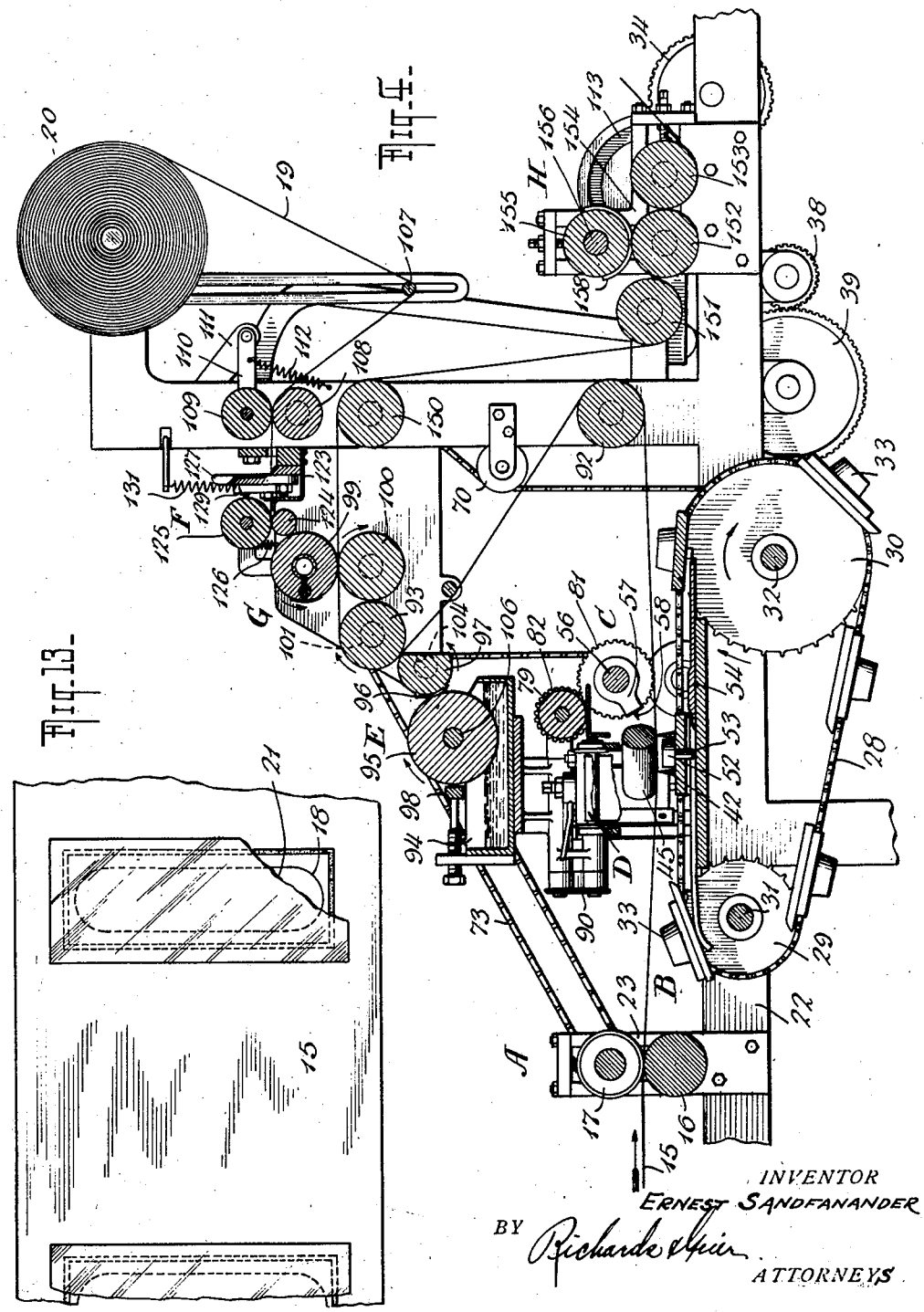
Figure 4 is a vertical longitudinal section through the machine with the endless conveyor removed which is utilized to discharge from the machine the cut-out portions of the web in which the window openings are formed.
Figure 5:
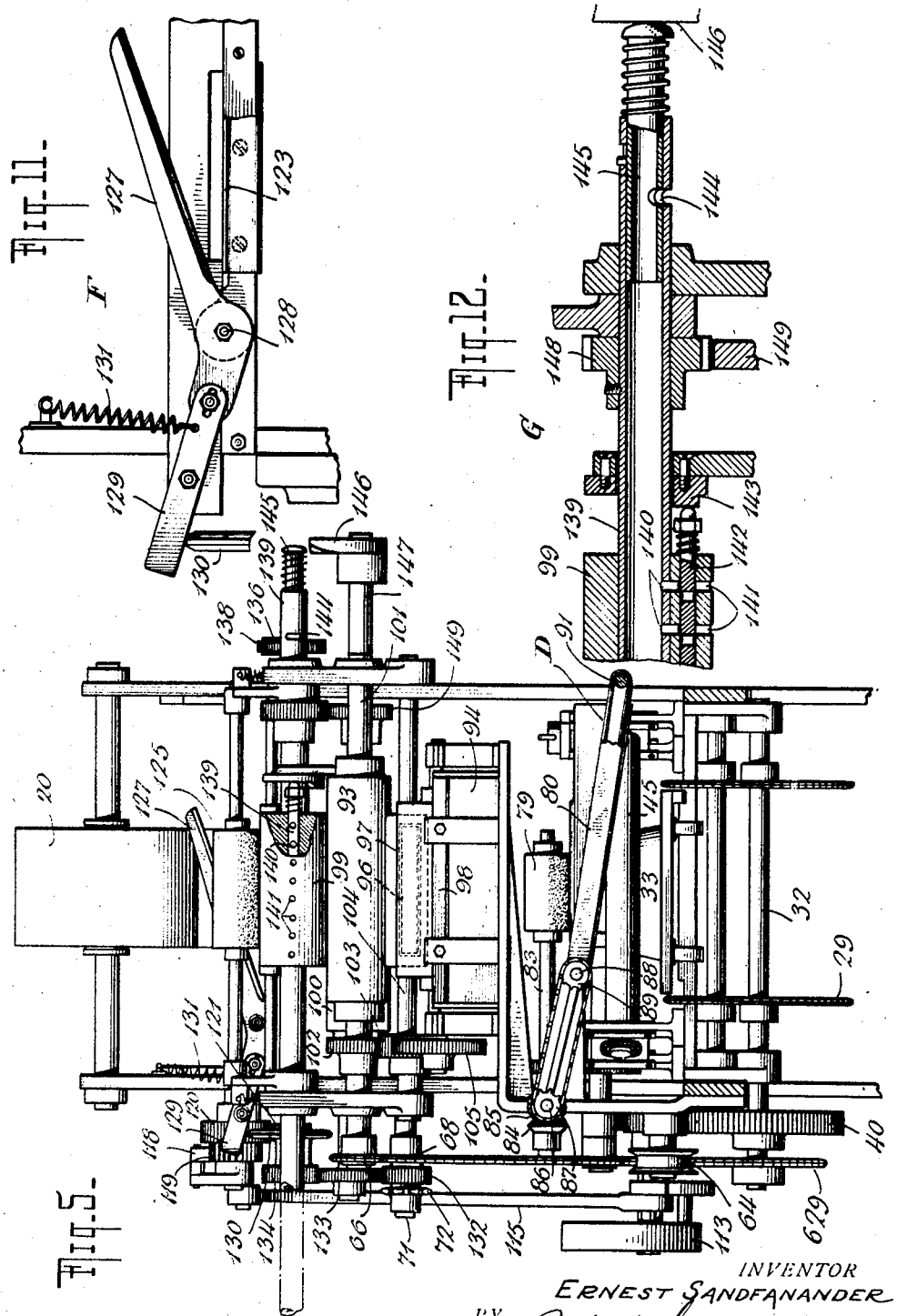
Figure 5 is a front elevation, with certain parts removed and others shown partly in section, and looking in the direction of the feeding end of the machine.
Figure 6:
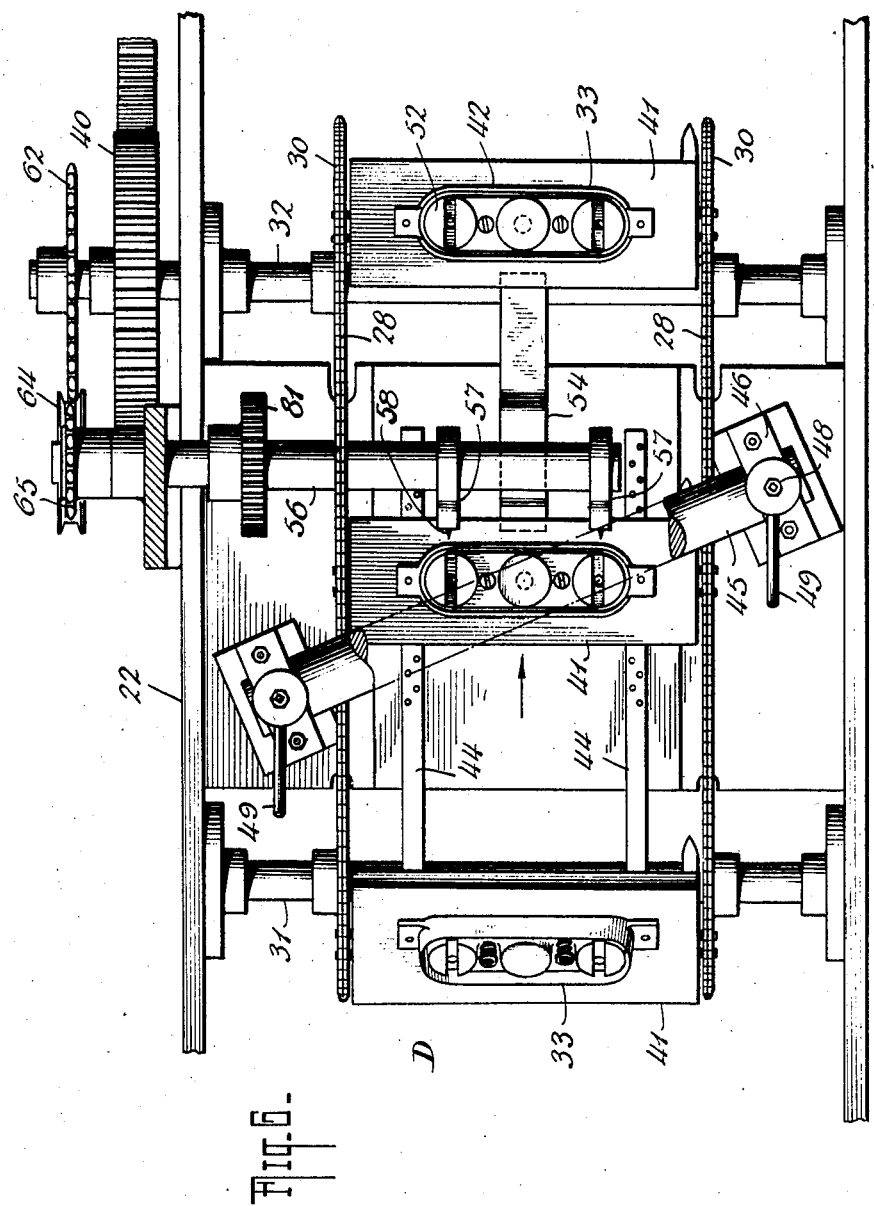
Figure 6 is an enlarged fragmentary plan view illustrating the cutting mechanism for forming the window openings in the web.

The web of paper 15 from which the envelopes are formed is fed into the machine from left to right, as viewed in Figure 4, between the feeding rollers 16 and 17 of a feeding mechanism A and from thence the web passes into cooperative relation to a cutting mechanism, generally indicated at B, which accomplishes the formation of a series of window openings 18 (Figure 13) in the web. After each opening is cut the cut-out portion of the web is removed from each cutting unit of the mechanism B by a pick-up mechanism C and delivered to a discharge conveyor, generally indicated at D (Figures 3 and 5) and thereby discharged from the machine. From the cutting mechanism the web is led to an adhesive-applying apparatus E which operates to surround each opening 18 with a strip or narrow band of adhesive. At the same time that the cutting and adhesive-applying operations are being performed a web 19 of transparent paper or similar material is being fed from the roll 20 to a cutting mechanism F which is operable to cut predetermined lengths from the web 19 to provide a cover 21 (Figure 13) for each of the window openings 18. These covers are successively fed by a suction apparatus G to the web 15, the operation of the latter apparatus being so timed that each cover will be applied directly over an opening 18 and caused to adhere to the web by the band of adhesive which has been previously applied thereto. The web 15, with the window openings formed therein and covers 21 applied, is now fed to a cutting mechanism, generally indicated at H, in which certain preliminary cutting operations of the web are accomplished, this mechanism forming no part of the present invention.

Specifically, the feeding mechanism is supported upon the main frame 22 of the machine and comprises the standards 23 in which the roller 16 is mounted for rotation. The roller 17 may be leather covered and has its ends supported in spring-pressed bearing blocks 24 the height of which may be adjusted by screws 25. In case it should be necessary to separate the rollers 16 and 17 to accomplish the initial feeding of the web 15 between the same, a lever 26 may be provided which carries a rod 27 engageable with the bearings 24 to lift the same against the tension of the springs bearing thereagainst, thereby elevating the roller 17 for the introduction of the end of the web between the rollers.

The cutting mechanism B employed to form the window openings in the web comprises the endless conveyor chains 28 on opposite sides of the machine extending around the small and large sprocket wheels 29 and 30 mounted, respectively, upon shafts 31 and 32 journaled in the sides of the frame 22. Carried by the chains 28 and extending therebetween are a plurality of cutting units, generally indicated by 33, which are successively brought into cooperative relation with the web 15 to form the window openings therein. The power for operating the cutting mechanism B is derived from a gear 34 at the left of Figure 2, driven from any suitable source and which operates the train of gears 35, 36, 37 and 38, the latter gear meshing with the large gear 39 which in turn engages the gear 40 mounted upon the shaft 32, driving the latter shaft to continuously operate the cutting mechanism.

Referring especially to Figures 7 to 10, each unit of the cutting mechanism is shown as comprising a base 41 extending between the two chains 28 and having mounted thereon the die 42, the edge of which is of the same configuration as the opening 18 to be formed in the web. As each cutting unit reaches its upper position, as shown at the left of Figure 4, the runners 43 on the bottom of the base 41 engage the ball bearing rails 44 which form a track for the unit so as to maintain it at the proper elevation for the cutting operation. Cooperating with each cutting unit as it reaches its cutting position (Figure 7) is an idler roller 45 supported in bearings 46 on opposite sides of the machine and preferably disposed diagonally with respect to the web 15 so as to better effect a cutting of the web as the die 42 passes beneath the roller, which is turned by the frictional contact of the web and through the pressure of the roller against the edge of the die. In order that the proper amount of pressure may be applied to the roller 45 the bearings 46 are adjustable vertically in the frames 47 in which they are mounted, the adjustment being accomplished by spindles 48 turned by the handles 49 to raise and lower said bearings. Each bearing 46 consists of upper and lower portions between which is inserted a layer 50 of rubber which will afford a slight degree of upward movement of the lower portion of the bearing so that the shaft 45 will yield upwardly in the event that the die 42 exerts an excessive pressure against said roller as the die passes from beneath, which pressure may be caused by a slight variation in the height or elevation of the die as the unit passes along the rails 44. Thus as the die 42 and roller 45 cooperate a shearing action is effected on the web and a portion thereof is cut out to form the window opening. This cut-out portion temporarily rests upon the heads of the screws 51 extending upwardly from the base 41 within the confines of the die 42. Said cut-out portion remains in this position until it is picked up by the mechanism C. When the cutting unit comes into cooperative relation with said mechanism C, an ejector block 52 supported upon the base 41 is elevated temporarily by a depending extension 53 of said block coming in contact with a shoe 54 disposed between the rails 44. Thereby the ejector block is raised against the tension of the springs 55 encircling the screws 51 and bearing against the upper surface of said block. This elevation of the ejector block occurs directly beneath the shaft 56 of the pick-up mechanism, which shaft carries a pair of arms 57 each having a point 58 upon the free end thereof which is designed to penetrate the cut-out portion of the web and remove the same from the ejector block. For this purpose the block 52 is provided in vertical alignment with the arms 57 with transverse slots 59 to afford clearance for the points 58 as the arms 57 are rotated. Intermediate the ends of each slot 59 there is provided a recess 60 for the entrance of the point 58 as its arm 57 is rotating and the cutting unit is moving over the shoe 54, as shown in Figure 8. The cut-out portion 61 is thus impinged upon the points 58 and removed from the cutting unit subsequent to which said portion 61 is delivered to the discharge conveyor D in a manner to presently appear.

Figure 1:
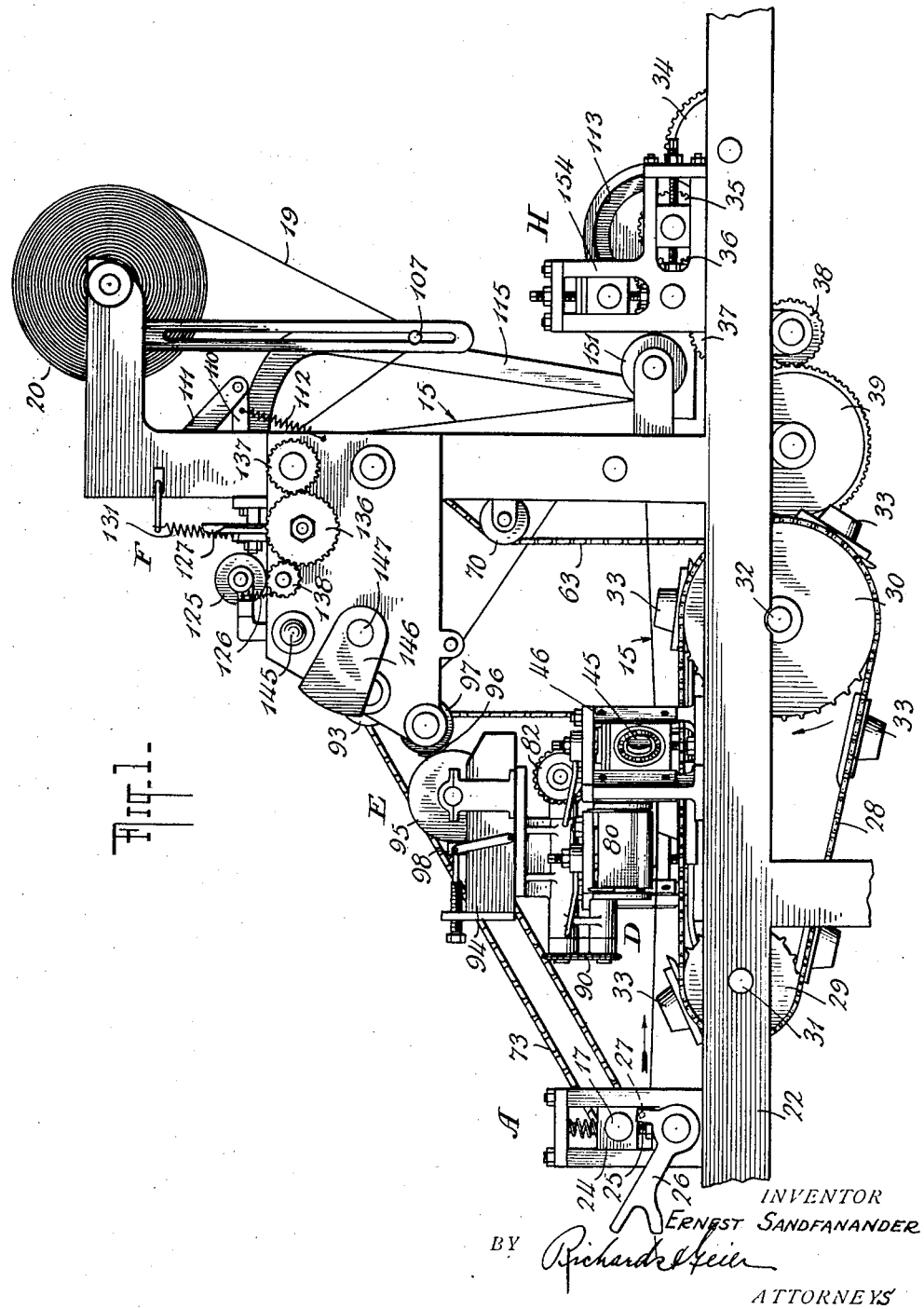
Figure 1 is an elevational view of one side of the machine constructed in accordance with the invention.
Figure 2:
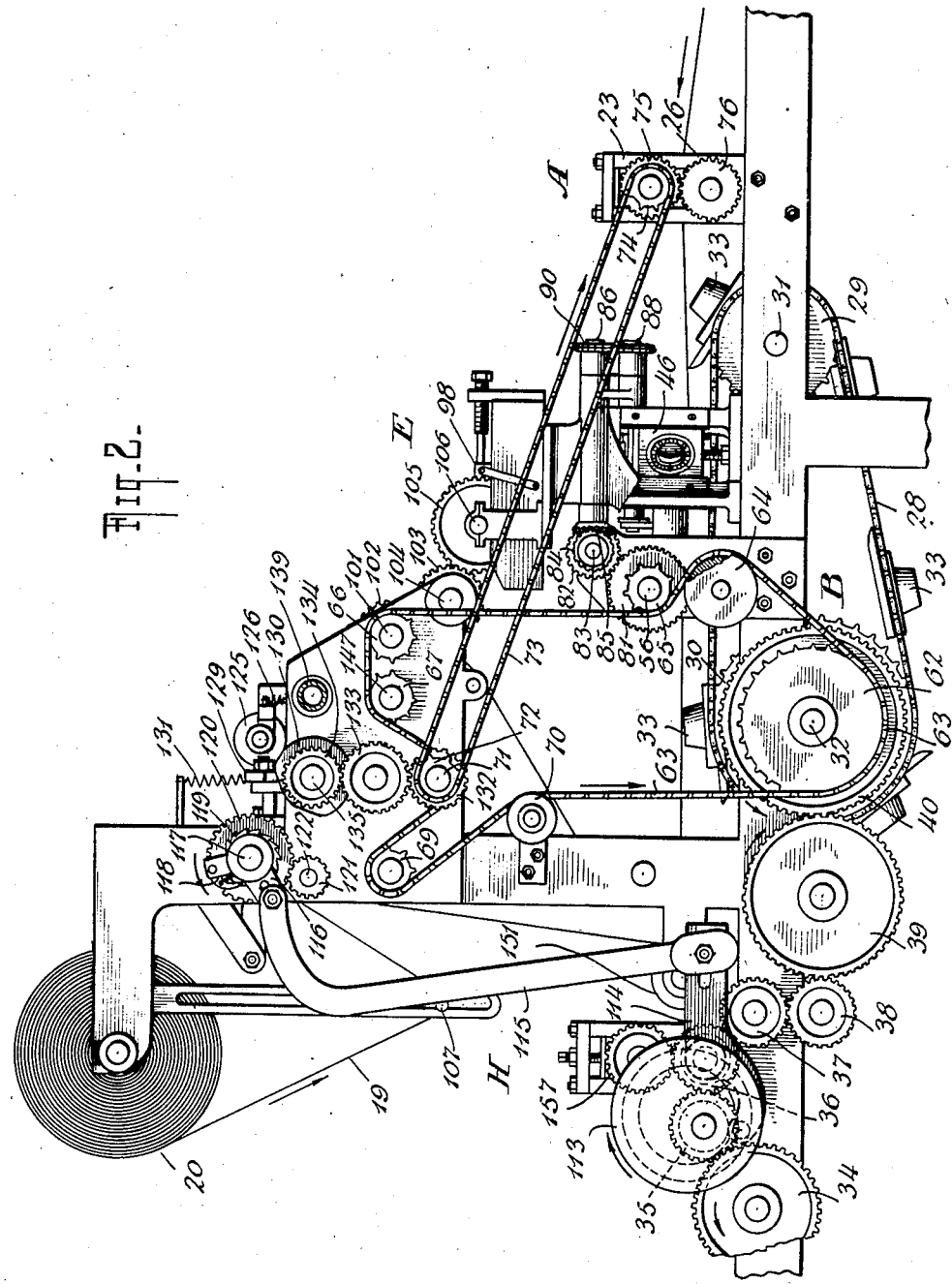
Figure 2 is a similar view looking at the other side of the machine.

It is desired at this point to explain the manner in which the shaft 56 is rotated and incidentally to describe the operation of the feeding mechanism A, reference being had to Figure 2 for this purpose. The shaft 32, in addition to carrying the sprockets 30 and gear 40, also has fixed thereon the sprocket 62 with which is engaged the chain 63. This chain passes around a guide pulley 64, meshes with a sprocket 65 on the shaft 56 so that the latter is driven, and from thence passes around sprockets 66, 67, 68 (Figure 5) 69, and then over the guide pulleys 70 to the sprocket 62. The function of the various sprockets 66 to 69 will be later described. For driving the feeding mechanism A, the sprocket 68 is mounted upon a stub shaft 71 which carries a sprocket 72 about which the drive chain 73 extends. This chain also engages a sprocket 74 secured to the shaft of the rollers 17 and this roller also carries a gear 75 meshing with a similar gear 76 on the roller 16 so as to rotate the latter roller in an opposite direction from the roller 17.

Returning now to the operation of the pick-up mechanism C, after the cut-out portion 61 has been removed from the cutting unit, the arms 57 continue their rotation and finally pass through slots 77 (Figures 7 and 8) of the delivery platform 78 upon which the portion 61 is deposited as the arms continue their rotation. When on the platform 78 the portion 61 is engaged by a continuously driven roller 79 which may be of rubber and is thereby delivered from said platform on to the inclined belt 80 of the conveyor D which extends transversely of the machine and which is continuously driven so that the portion 61 deposited thereon will be carried to the lower end of the conveyor and discharged from the side of the machine. To drive the roller 79, the shaft 56 carries a large gear 81 which meshes with a smaller gear 82 mounted upon the shaft 83 of said roller.

The operation of the conveyor D will now be described. This conveyor is driven from the shaft 83 which carries a bevel gear 84 meshing with a similar gear 85 on one end of the shaft 86, the other end of which carries a sprocket 87. Another shaft 88 about which the conveyor belt 80 passes also carries a sprocket 89 driven from the sprocket 87 by the chain 90 whereby the shaft 88 is rotated to impart a continuous movement to the belt 80 about said shaft and its lower idler shaft 91 at the discharge end of the conveyor D.

After the web 15 has passed the cutting mechanism it is extended around an idler 92 (Figure 4) and from thence upwardly to the roller 93. At this point the adhesive-applying apparatus E becomes effective to apply a band of adhesive around the window opening 18 in the web, as indicated in Figure 13. The apparatus E comprises a reservoir 94 for containing a suitable adhesive such as glue and supported in any convenient manner above the conveyor D. Journaled for rotation in the reservoir and partially immersed in the adhesive is a feed roller 95 which is adapted to apply adhesive to a die 96 carried by the roller 97 each time said die comes in contact with the surface of the roller 95. This die is of substantially rectangular shape and is sufficiently large to completely surround the opening 18 in the web as the die contacts therewith so that the adhesive on the die is applied to the web as previously mentioned. To secure an even distribution of the adhesive over the surface of the roller 95 a doctor bar or blade 98 is adjustably supported above the reservoir 94 to contact with the surface of said roller as it rotates. After the application of the adhesive to the web the latter passes between the opposed rollers 99 and 100, at which time the transparent cover is applied to the web in a manner presently to appear. To drive the rollers associated with the adhesive-applying apparatus the operation of the sprocket 66 is utilized. This sprocket is mounted upon the shaft 101 of the roller 93 and carries the gear 102 which meshes with a gear 103 on the shaft 104 of the roller 97 to drive the latter roller in the opposite direction from the roller 93. Meshing with the gear 103 is a gear 105 secured to the shaft 106 which carries the roller 95 so that said roller is driven in a clockwise direction, as viewed in Figure 4. Thus, after the application of the adhesive to the die 96 the rotation of the roller 97 brings said die into contact with the web 15 just prior to its engagement with the roller 93.

The cutting of the transparent web into predetermined lengths to form covers and the feeding and application of the latter to the envelope web will now be described. The web 19 is fed from the roll 20 around a guide 107 supported by the frame of the machine and upwardly to the intermittently operated feed rollers 108 and 109, the latter of which is an idler and may be made of rubber to better feed the web to the cutting device F. The roller 109 is provided with an arm 110 pivotally supported on a bracket 111 and connecting the arm 110 with the frame of the machine is a spring 112 which exerts a downward pull upon the arm to maintain a constant and uniform pressure of the roller 109 against the roller 108. To intermittently rotate the roller 108 there is provided an eccentric 113 (Figure 2) mounted upon the shaft of the gear 35 and with which is engaged one end of the rocker arm 114 loosely mounted for oscillation upon the shaft of the gear 36. To the other end of the arm 114 there is pivoted the lower end of the connecting rod 115, the upper end of which is pivotally connected to a lever 116 loose upon the stub shaft 117 and carrying therewith the spring pawl 118. This pawl engages the teeth of a ratchet 119 fixed on the shaft 117 so that when the pawl is operated by the lever 116 in a direction to rotate the ratchet the gear 120 also fixed upon said shaft is rotated. The movement of this gear is transmitted to a smaller gear 121 fixed upon the shaft 122 which carries the roller 108. The mechanism just described is shown in Figure 2 in the position in which the connecting rod 115 is at the beginning of its upward movement and during this movement the pawl 118 rides idly over the ratchet 119, with the result that the rollers 108 and 109 remain stationary. Upon the return movement of the rod 115 under the control of the eccentric 113 the pawl 118 becomes effective to rotate the ratchet 119 in a counterclockwise direction thereby rotating the shaft 122 to operate the rollers 108 and 109 so as to feed a predetermined length of the web 19 to the cutting apparatus F. At the cessation of this feeding operation the rod 115 again starts its upward movement and the rotation of the rollers 108 and 109 stops, thereby positioning the predetermined length of the web 19, which is to constitute a cover for one of the window openings, on the support 123 of the cutting apparatus F with the forward edge of the web located between the feed rollers 124 and 125, the latter roller being similar in construction to the roller 109 and having a downward pull exerted thereon by the spring 126.

The cutting apparatus F now becomes effective to cut the predetermined length positioned on the support 123 from the web 19. This cutting apparatus comprises a cutter or knife 127 mounted for oscillation at 128 adjacent one end thereof and to said end there is connected an operating lever 129 controlled by a cam 130 and a spring 131, the latter of which exerts an upward pull upon one end of the lever to maintain the other end in engagement with the cam 130. As said cam is continuously rotated and its reduced peripheral portion engages the end of the lever 129 the spring 131 rocks said lever with the result that the knife 127 is moved downwardly about its pivot from the position shown in Figure 11 to cut the web 19. This operation occurs at the termination of the feeding of the web, as previously described, while during said feeding operation the arcuate or major portion of the cam 130 is engaged with the lever 129 to maintain the knife in elevated position.

The means to continuously drive the cam 130 is connected to the shaft 71 and comprises a gear 132 fixed on said shaft and driving an idler gear 133 which in turn meshes with a gear 134 secured on the stub shaft 135 which carries said cam. Upon completion of the cutting operation and during the return movement of the knife 127 the feeding mechanism, including the rollers 108 and 109, again become effective to feed the web to the cutting apparatus and at the same time the rollers 124 and 125 are operated to discharge the severed portion of the web forming the window opening cover on to the roller 99. This feeding or discharge of the cut portion of the web is accomplished through the intermediary of an idler gear 136 meshing with a gear 137 secured on the shaft of the roller 108 and with the gear 138 secured to the end of the lower roller 124 which drives the upper roller through frictional contact therewith.

The roller 99 to which the window cover is fed constitutes a suction means designed to convey the cover from its discharge point between the rollers 124, 125 to the web 15 as it passes from the roller 93 to and between the rollers 99 and 100. This suction means, best illustrated in Figure 12, comprises a manifold 139 which extends through the roller 99 and revolves therewith. One end of the manifold is connected to a suitable suction pump (not shown). In the portion of the manifold located within the roller 99 the same is provided with a series of openings 140 communicating with radial openings 141 in said roller and the passage of air into said manifold through said openings is controlled by a sliding spring-pressed valve 142 extending longitudinally through the roller and having one end projecting therefrom to engage a stationary cam 143 suitably supported by the frame of the machine. As the roller 99 is being rotated preparatory to receiving a window cover thereon the parts are in the position shown in Figure 12 with the valve closed so as to shut off the suction at the periphery of the roller adjacent the openings 141. This closing of the valve occurs at the time when the cover is laid upon the web 15, or, in other words, when the roller 99 has just passed the position shown in Figure 4. The shutting off of the suction is effected for the purpose of preventing any possibility of the cover adhering to the roller 99 while pressure is being exerted upon the cover by said roller and the roller 100 to press the cover against the web 15 and cause it to adhere to said web by reason of the adhesive thereon. In order to obviate a possibility of any suction at the periphery of the roller 99 during this interval, by reason of leakage past the valve 142, the manifold 139 is provided with a vent 144 (Figure 12) controlled by a spring-pressed sleeve valve 145 which is intermittently operated by contact with a continuously rotating cam member 146 carried by the shaft 147 at the end thereof opposite the end carrying the sprocket 67. The rotation of the roller 99 and manifold 139 is accomplished by means of a gear 148 secured upon the manifold and meshing with a gear 149 secured upon the shaft 147 (see Figure 5). As the roller 99 reaches a position wherein the openings 141 are extending upwardly in a substantially vertical direction the end of the valve 142 passes on to the reduced portion of the cam 143 and is thereby permitted to move to an open position so as to establish communication between said openings and the interior of the manifold whereby suction is produced at the periphery of the roller. At the same time the cam member 146 disengages from the end of the valve 145 and this valve moves outwardly relative to the manifold to close the vent 144. The suction thus produced at the periphery of the roller picks up the window cover which has been discharged from between the rollers 124 and 125 and carries said cover around until it is brought into engagement with the web 15 and in exact registration with a window opening 18 therein. At this time the valve 142 again engages the thickened portion of the cam 143 and said valve is closed thereby shutting off the suction at the periphery of the roller 99, thus releasing the cover and permitting it to be attached to the web by the pressure of the rollers 99 and 100 between which the web and cover now pass. The web 15 now passes over the roller 150 driven by the sprocket 69 and is fed to the cutting mechanism H. As this mechanism forms no part of the present invention, it being merely shown to illustrate one method of continuing the operation of completing the formation of the envelope, a brief description thereof will suffice. The mechanism shown operates to cut the marginal edges of the web 15 at intervals to form side flaps for the envelope and comprises a series of rollers 151, 152 and 153 under and over which the web successively passes, the first named roller being an idler and the last two rollers being driven, respectively, by the shafts upon which the gears 36 and 35 are secured. The rollers 152 and 153 are supported in a suitable framework 154 and the roller 152 is engaged by a pressure roller 155, the shaft 156 of which is driven by a gear 157 meshing with the gear 36. The roller 155 carries adjacent each end the segmental cutting blades 158 which engage in grooves in the roller 152 upon each revolution of said rollers to cut away portions of the marginal edges of the web 15, leaving other portions uncut to form the side flaps of the envelope.

What is claimed is:

1. In an envelope-making machine, means to feed a web of paper through the machine, a mechanism to cut a window opening in said web including a die engageable with the web and a roller arranged diagonally relative to the web and cooperating with said die to shear the material of said web to form said opening.

2. In an envelope-making machine, means to feed a web of paper through the machine, a mechanism for cutting window openings in said web at regular intervals including an endless conveyor movable with the web, a plurality of dies carried by said conveyor with which the web is successively engageable, and a pressure roller cooperating with said dies and disposed diagonally relative to the direction of movement of the web and beneath which said web and dies move.

In testimony whereof I have affixed my signature.

ERNEST SANDFANANDER.